United States Patent [19]

Reidelbach et al.

[11] 4,013,317
[45] Mar. 22, 1977

[54] LATERAL PROTECTION FOR MOTOR VEHICLES

[75] Inventors: Willi Reidelbach, Sindelfingen; Herbert Grach, Munich; Hans Lütze, Aidlingen; Dieter Weidemann, Weil der Stadt, all of Germany

[73] Assignee: Daimler-Benz Aktiengesellschaft, Germany

[22] Filed: Mar. 12, 1976

[21] Appl. No.: 666,419

Related U.S. Application Data

[63] Continuation of Ser. No. 461,112, April 16, 1974, abandoned.

[30] Foreign Application Priority Data

Apr. 16, 1973 Germany .......................... 2319124

[52] U.S. Cl. .............................. 296/146; 296/28 R
[51] Int. Cl.² ..................... B62D 21/00; B60J 5/04
[58] Field of Search ............ 296/28 R, 146, 150 R; 49/383

[56] References Cited

UNITED STATES PATENTS

| | | | |
|---|---|---|---|
| 2,474,992 | 7/1949 | Stephenson | 296/28 R |
| 2,955,871 | 10/1960 | Himka | 49/383 |
| 3,718,364 | 2/1973 | Fischer | 296/28 R |
| 3,788,686 | 1/1974 | Rossie | 296/146 |

Primary Examiner—Philip Goodman
Attorney, Agent, or Firm—Craig & Antonelli

[57] ABSTRACT

A lateral protection for motor vehicles in which at least one reinforcement extending essentially in the vehicle longitudinal direction is arranged on the inside of each door, whereby in case of an external force influence or action which occurs in the vehicle longitudinal direction the reinforcements, preferably constructed as hollow bearers, are supported in the vehicle longitudinal direction with one end each either directly or indirectly at a fixed structural part such as, for example, at an upright column or at a wheel casing or at a further reinforcement belonging to an adjacent door.

14 Claims, 6 Drawing Figures

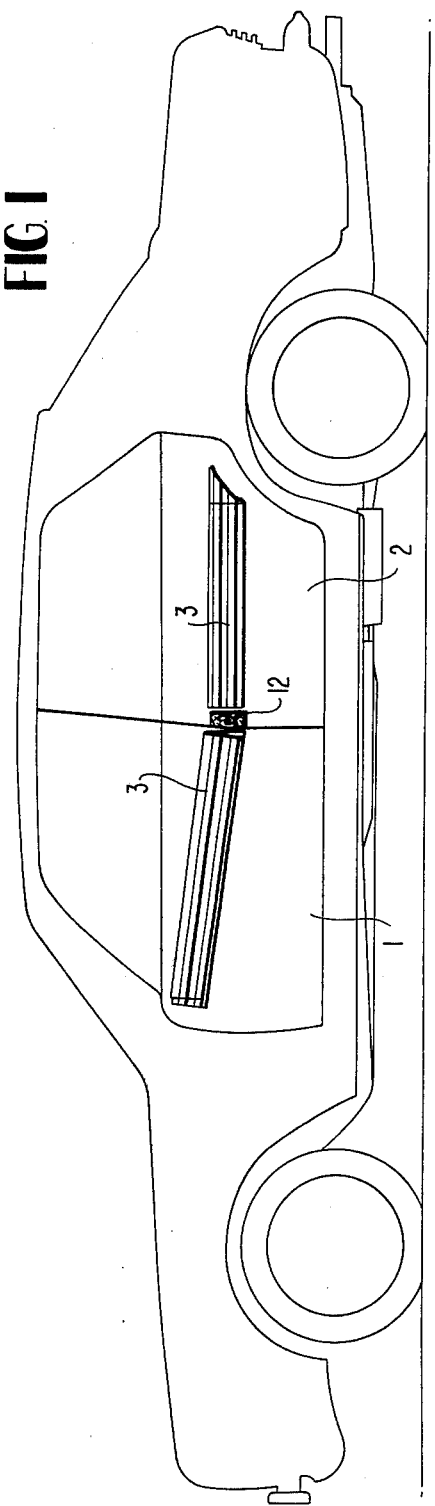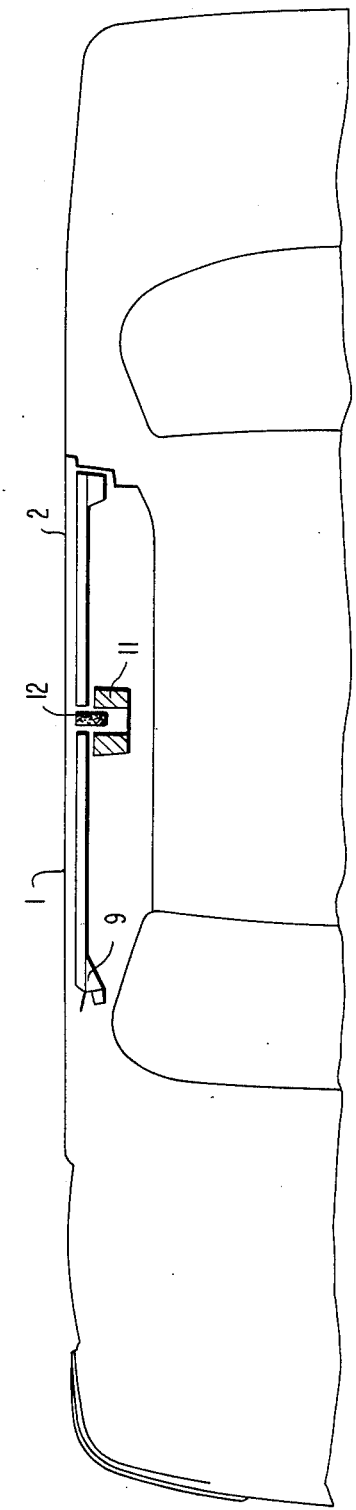

LATERAL PROTECTION FOR MOTOR VEHICLES

This is a continuation division of application Ser. No. 461,112 filed Apr. 16, 1974, now abandoned.

The present invention relates to a lateral protection for motor vehicles in which one reinforcement each extending respectively in the vehicle longitudinal direction is arranged on the inside of the doors.

It is known, for example, from the German Offenlegungsschrift 1,962,279 to provide hollow bearers consisting of sheet metal on the inside of the door of a motor vehicle which serve for purposes of reinforcement of the door and therewith for the protection of the vehicle passengers against laterally occurring impacts in case of accidents.

The present invention is concerned with the task to further develop such a prior art flank protection for motor vehicles in such a manner that this flank protection can contribute without large additional structural expenditures also to the reinforcement, for example, of the passenger cell of a passenger motor vehicle in case of a front end impact, i.e., in case of forces acting in the vehicle longitudinal direction.

This is achieved according to the present invention in that the reinforcements preferably constructed as hollow bearers, in case of a force influence or action which occurs in the vehicle, are supported in the vehicle longitudinal direction with each end directly or indirectly at a relatively fixed structural part such as, for example, at an upright column or at a wheel casing or at a further reinforcement belonging to an adjacent door.

An uninterrupted force flow, for example, along the lateral parts of the passager cell of a passenger motor vehicle is achieved thereby and the high compressive strength of already present hollow bearers of the lateral protection is utilized in a meaningful manner.

According to one preferred embodiment of the present invention, a support bracket may be arranged between the end of a reinforcement and a column of the vehicle superstructure which is secured at the reinforcement or at the door. Such a construction is possible when a free space has to be bridged between the end of a reinforcement and the relatively fixed vehicle part at which the reinforcement is to be supported.

It may also be advantageous if a tie beam or latching bar which serves the mutual support of the reinforcements and is preferably arranged at a vehicle column and which is displaceable in the vehicle transverse direction or vetically, is arranged between the mutually facing ends of the reinforcements arranged in adjacent doors. This tie beam or latching bar should thereby be automatically displaceable, preferably in dependence on the position of the coordinated door, in such a manner that with closed doors it is disposed in a position between the ends of the reinforcements. Such a construction can be used, for example, if the space present between the ends of reinfocements arranged in two adjacent doors, has to be kept free during the opening of one door for the inward pivoting movement of a door fold or the like and the arrangement of a fixed support bracket is therefore not possible.

Analogously thereto, it may also be of advantage if a tie beam or latching bar which serves for the support of the reinforcement with a closed door and which is displaceable in dependence on the door movement, is arranged between one end of a reinforcement and a fixed vehicle part.

A particularly simple construction of a reinforcement is attained if the door outer cover panel serves as closure panel for the reinforcement arranged on the inside of the door and constructed as hollow bearer. Spot welded points or the like which might thereby be possibly visible at the outer body cover panel, may be covered off, for example, by decorative strips.

A particularly simple and effective increase of the lateral protection is achieved if within the lower area of the doors an angle member secured at the doors engages from behind a sheet metal place projecting from the outer vehicle longitudinal bearers. As a result of this "claw-like interengagement" of door and longitudinal bearer, impact loads and forces on the yielding door zones between the reinforcement and the lower door edge are absorbed in a particularly favorable manner by way of tensional forces.

Accordingly, it is an object of the present invention to provide a lateral protection for motor vehicles which avoids by simple means the aforementioned shortcomings and drawbacks encountered in the prior art.

Another object of the present invention resides in a lateral protection for motor vehicles which can be used for improving the reinforcement when forces occur that act in the vehicle longitudinal direction, for example, in case of an end collision, without the need for large additional structural expenditures.

A further object of the present invention resides in a lateral protection for motor vehicles which permits the utilization of the high compressive strength of the hollow bearers provided therefor, for the contribution to the rigidity in the longitudinal direction of the vehicle, especially of the passenger cell.

Still a further object of the present invention resides in a lateral protection for motor vehicles which not only effectively protects the passenger cell against lateral impacts but also improves the overall protection to the vehicle passengers against forces occurring in the longitudinal direction of the vehicle.

Still another object of the present invention resides in a lateral protection for motor vehicles which is simple in construction yet is highly effective not only to protect the passengers against lateral forces and impacts but also to offer additional protection against forces which impinge on the vehicle in the longitudinal direction.

These and further objects, features, and advantages of the present invention will become more apparent from the following description when taken in connection with the accompanying drawing which shows, for purposes of illustration only, several embodiments in accordance with the present invention, and wherein:

FIG. 1 is a schematic side view of a passager motor vehicle constructed in accordance with the present invention;

FIG. 2 is a schematic top plan view of the vehicle according to FIG. 1, illustrating some parts in cross section for purposes of clarity;

Figure 5:
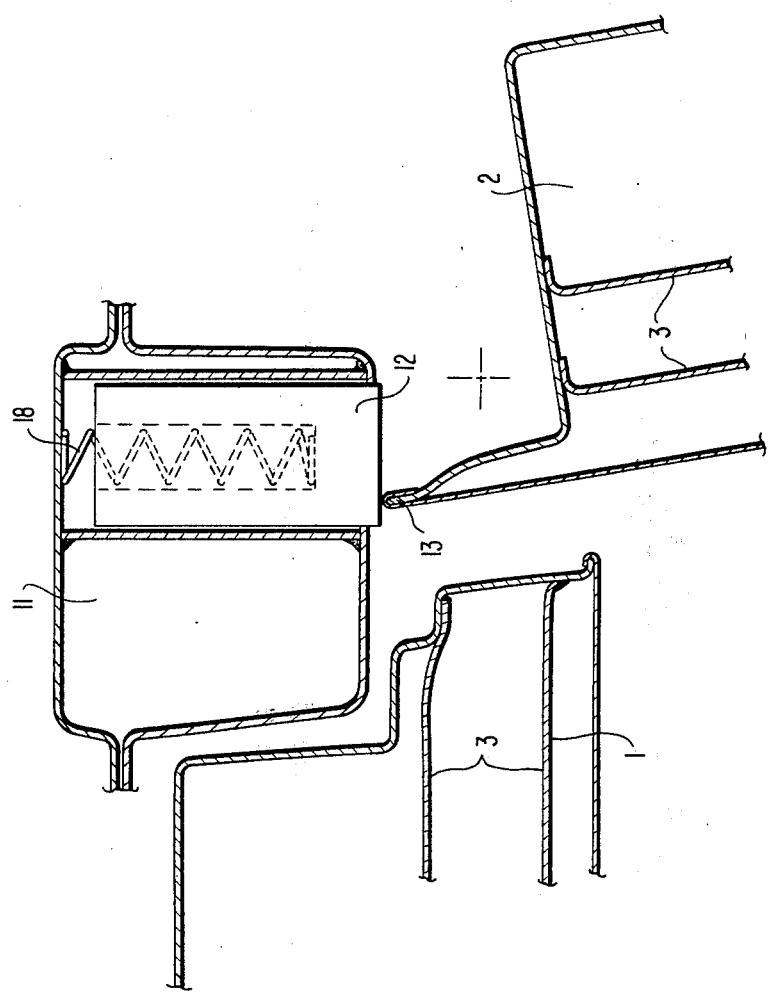
FIG. 5 is a horizontal cross-sectional view through a center column of a passenger motor vehicle together with the adjoining area of two doors in accordance with the present invention.
Figure 3:
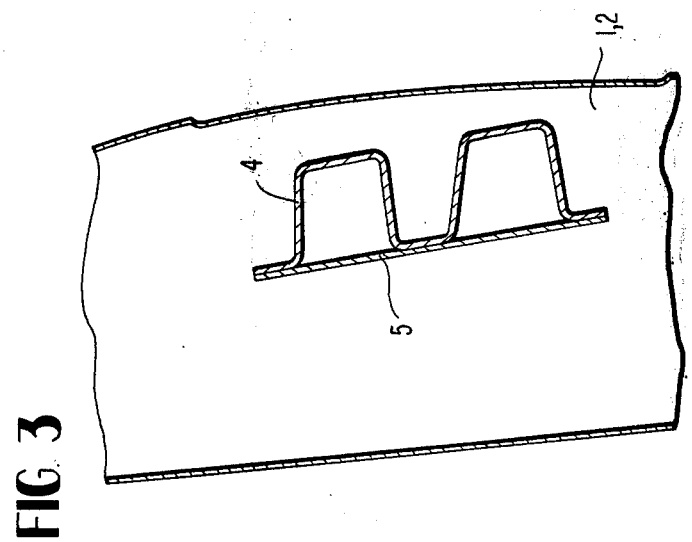
FIG. 3 is a vertical cross-sectional view through a vehicle door with a reinforcement constructed as double hollow bearer in accordance with the present invention.
Figure 4:
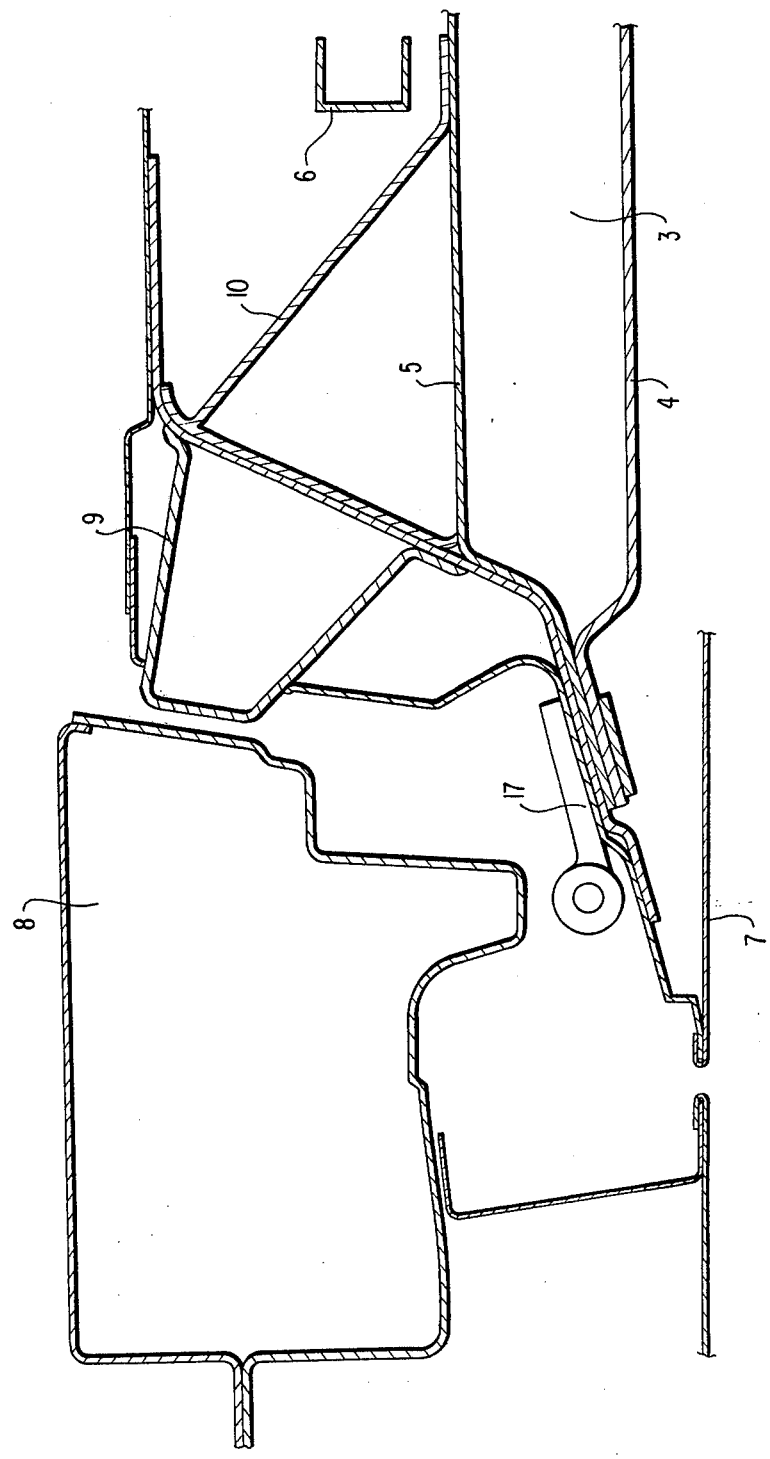
FIG. 4 is a horizontal cross-sectional view through the forward wall column of a passenger motor vehicle together with the adjoining area of a forward door in accordance with the present invention.

Referring now to the drawing wherein like reference numerals are used throughout the various views to designate like parts, and more particularly to FIGS. 1 and 2, one reinforcement 3 each is arranged on the inside of the front doors 1 and of the rear doors 2 of the passenger motor vehicle illustrated in these figures. The reinforcement 3 consists of a profile member 4 and of a sheet-metal closure panel 5 (FIG. 3). It can be seen from FIG. 4 that the reinforcement 3 is arranged between the window guidance 6 and the outer body panel 7 of the vehicle door 1. In order to enable a support of the reinforcement 3 illustrated in FIG. 4 at the forward wall column 8 of the vehicle in case of a front end impact, the space remaining between these structural parts is bridged by a support bracket 9 secured at the driver or front door 1. For the purpose of better force transmission from the reinforcement 3 to the support bracket 9, a reinforcing plate 10 is thereby additionally provided, and the door hinge 17 is secured directly at the reinforcement 3.

In order to bridge the space present within the area of the center column 11 between the reinforcements 3 which are arranged in the front door 1 and in the rear door 2, a tie beam or latching bar 12 displaceable in the vehicle transverse direction against the force of a compression spring 18 is arranged at the center column 11; the movement of the tie beam or latching bar 12 is so controlled in dependence on the position of the rear door 2 by the door fold 13 thereof that it is disposed between the ends of the two coordinated reinforcements 3 when the doors 1 and 2 are closed, and during the opening of the rear door 2 is pushed back in order to permit a pivoting movement of the door fold 13.

Figure 6:
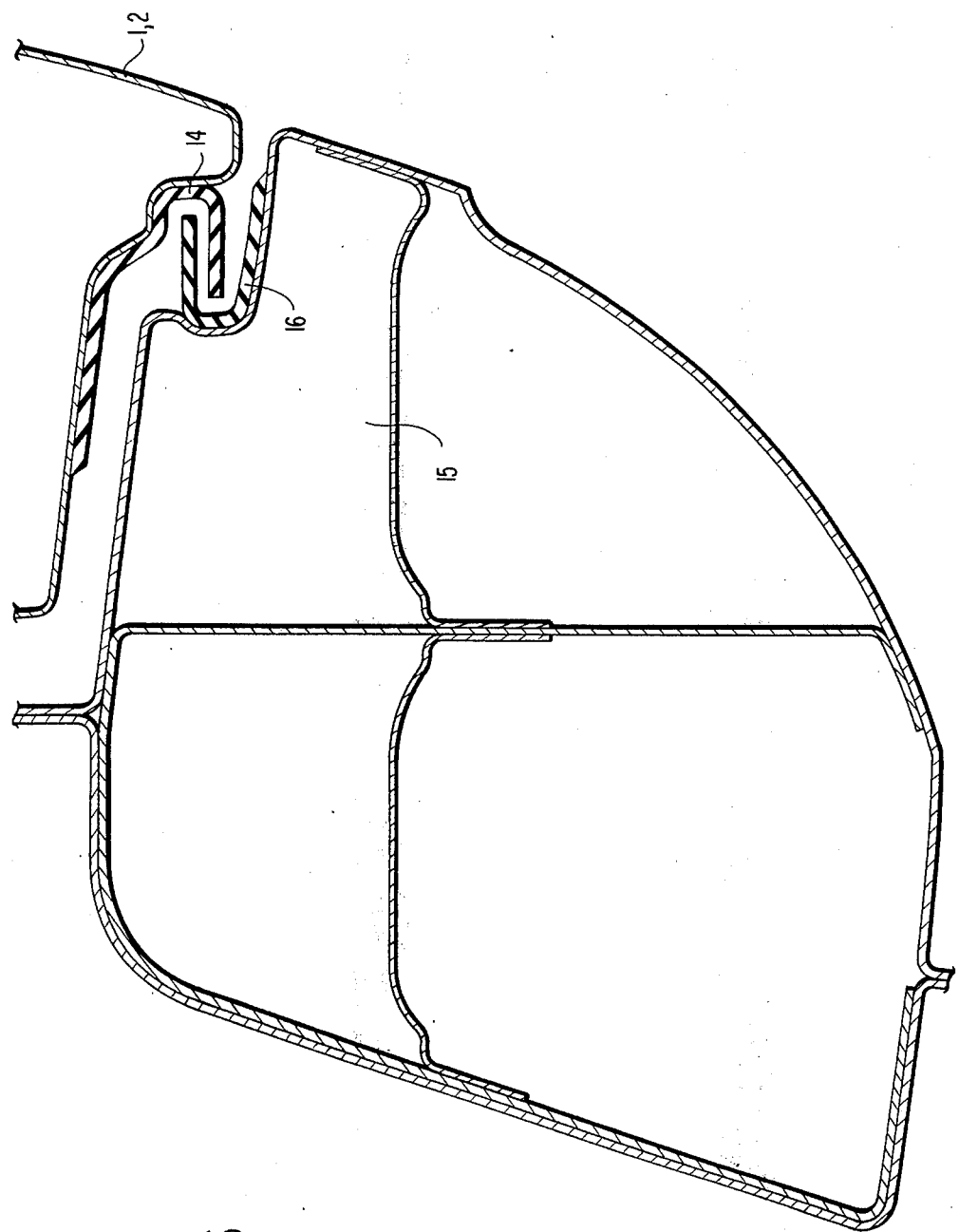
FIG. 6 is a somewhat schematic cross section through an outer vehicle longitudinal bearer and the portion of a door disposed thereabove in accordance with the present invention.

Finally, FIG. 6 of the drawing illustrates how by simple means a considerable increase of the resistance in ease of a lateral impact can be achieved. For that purpose, an angle member 14 secured at one of the doors 1 and 2 which is arranged within the lower area of this door, thereby engages behind a sheet metal plate 16 projecting from the outer vehicle longitudinal bearer 15, the so-called threshold bearer.

While we have shown and described several embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. In a protection device for a vehicle of the type including side doors, relatively fixed structural parts of said vehicle for defining the side door openings, and reinforcement means for absorbing lateral impact forces on said vehicle, said reinforcement means extending in the longitudinal direction of said vehicle inside said doors, the improvement comprising structural force transmission means at each end of said reinforcement means for directly transmitting longitudinal impact forces on said vehicle between said reinforcement means and relatively fixed structural parts such that said longitudinal impact forces on said vehicle are directed uninterruptingly in said longitudinal direction by said structural force transmission means and said reinforcement means, and wherein said structural force transmission means includes at least one of a profiled hollow structural member arranged between one end of said reinforcement means and said relatively fixed structural parts of said vehicle and a structural bar interposed between aligned facing ends of two longitudinally disposed reinforcement means of two respective longitudinally disposed side doors arranged at least at one side of said vehicle.

2. A protection device according to claim 1, wherein said profile hollow structural member is mounted between said one end of said reinforcement means and an upright column of said vehicle, said upright column defining at least one portion of said side door openings.

3. A protection device according to claim 2, wherein said upright column is a forward wall column of said vehicle relatively fixed structural parts.

4. A protection device according to claim 2, wherein said profiled hollow structural member is secured at said upright column.

5. A protection device according to claim 2, wherein said profiled hollow structural member is secured to the respective side door of said reinforcement means.

6. A protection device according to claim 1, wherein said relatively fixed structural part includes a wheel casing.

7. A protection device according to claim 1, wherein said structural bar is mounted at a vehicle center column such that only said structural bar is interposed between said aligned facing ends of said two reinforcement means.

8. A protection device according to claim 1, wherein said structural force transmission means includes both said profiled hollow structural member and said structural bar.

9. A protection device according to claim 1, wherein said reinforcement means includes at least one hollow bearer member.

10. A protection device according to claim 2, wherein said vehicle further includes longitudinal bearer members extending at the lower portion of said side doors, each of said side doors including an angle member at the lower portion for engaging a plate projecting from said longitudinal bearer members.

11. In a protection device for a vehicle of the type including side doors, relatively fixed structural parts of said vehicle for defining the side door openings, and reinforcement means for absorbing lateral impact forces on said vehicle, said reinforcement means extending in the longitudinal direction of said vehicle inside said doors, the improvement comprising structural force transmission means at each end of said reinforcement means for directly transmitting longitudinal impact forces on said vehicle between said reinforcement means and relatively fixed structural parts such that said longitudinal impact forces on said vehicle are directed uninterruptingly in said longitudinal direction by said structural force transmission means and said reinforcement means, wherein said structural force transmission means includes at least one of a profiled hollow structural member arranged between one end of said reinforcement means and said relatively fixed structural parts of said vehicle and a structural bar interposed between aligned facing ends of two longitudinally disposed reinforcement means of two respective longitudinally disposed side doors arranged at least at one side of said vehicle, wherein said profiled hollow structural member is mounted between said one end of said reinforcement means and an upright column of said vehicle, said upright column defining at least one portion of said side door openings, and wherein a hollow reinforcing member is secured to said one end of said reinforcement means and to said profiled hollow structural member such that said reinforcement means and said profiled hollow structural member are connected for transmitting said longitudinal impact forces.

12. A protection device according to claim 11, wherein a hinge for said side door is secured to said reinforcement means thereof separately from said hollow reinforcing member and said profiled hollow structural member.

13. In a protection device for a vehicle of the type including side doors, relatively fixed structural parts of said vehicle for defining the side door openings, and reinforcement means for absorbing lateral impact forces on said vehicle, said reinforcement means extending in the longitudinal direction of said vehicle inside said doors, the improvement comprising structural force transmission means at each end of said reinforcement means for directly transmitting longitudinal impact forces on said vehicle between said reinforcement means and relatively fixed structural parts such that said longitudinal impact forces on said vehicle are directed uninterruptingly in said longitudinal direction by said structural force transmission means and said reinforcements means, wherein said structural force transmission means includes at least one of a profiled hollow structural member arranged between one end of said reinforcement means and said relatively fixed structural parts of said vehicle and a structural bar interposed between aligned facing ends of two longitudinally disposed reinforcement means of two respective longitudinally disposed side doors arranged at least at one side of said vehicle, wherein said structural bar is mounted at a vehicle center column such that only said structural bar is interposed between said aligned facing ends of said two reinforcement means, and wherein means for movably mounting said structural bar to said vehicle center column are provided, said means for movably mounting displacing said structural bar into said vehicle center column during opening of one of said two doors.

14. In a protection device for a vehicle of the type including side doors, relatively fixed structural parts of said vehicle for defining the side door openings, and reinforcement means for absorbing lateral impact forces on said vehicle, said reinforcement means extending in the longitudinal direction of said vehicle inside said doors, the improvement comprising structural force transmission means at each end of said reinforcement means for directly transmitting longitudinal impact forces on said vehicle between said reinforcement means and relatively fixed structural parts, said structural force transmission means being mounted separately of vehicle door mounting devices such that said longitudinal impact forces on said vehicle are directed uninterruptingly in said longitudinal direction by said structural force transmission means and said reinforcement means, wherein said structural force transmission means includes at least one profiled hollow structural member mounted between a first end of one of said reinforcement means longitudinally mounted in a first side door of said vehicle and said relatively fixed structural parts of said vehicle, and a structural bar interposed between a second end of said one reinforcement means and an end of a second longitudinally mounted reinforcement means disposed in a second side door of said vehicle longitudinally adjacent said first side door at least at one side of said vehicle, said profiled hollow structural member being connected to said one reinforcement means by a hollow reinforcing member, and said profiled hollow structural member being disposed adjacent said relatively fixed structural parts of said vehicle at a predetermined gap which is bridged by abutment of said profiled hollow structural member and said relatively fixed structural parts of said vehicle upon occurrence of said longitudinal impact forces, said second end of said one reinforcement means and said end of said second reinforcement means being disposed adjacent said interposed structural bar at respective predetermined gaps which are bridged by abutment of said second end of said one reinforcement means and said end of said second reinforcement means with said structural bar upon occurrence of said longitudinal impact forces.

* * * * *